US007577909B2

(12) United States Patent
Harriger et al.

(10) Patent No.: US 7,577,909 B2
(45) Date of Patent: Aug. 18, 2009

(54) FLEXIBLE MANAGEMENT USER INTERFACE FROM MANAGEMENT MODELS

(75) Inventors: James D Harriger, Duvall, WA (US); Erin Bourke-Dunphy, Seattle, WA (US); Marco Chierotti, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 387 days.

(21) Appl. No.: 11/383,523

(22) Filed: May 16, 2006

(65) Prior Publication Data

US 2007/0271521 A1 Nov. 22, 2007

(51) Int. Cl.
*G06F 3/00* (2006.01)
*G06F 9/44* (2006.01)

(52) U.S. Cl. ............... 715/738; 715/744; 715/762; 717/101; 717/104; 717/111

(58) Field of Classification Search .......... 715/738, 715/744, 762–765; 717/104, 101, 111, 120; 709/201, 222, 224, 226; 707/100, 102
See application file for complete search history.

(56) References Cited

U.S. PATENT DOCUMENTS

| 6,342,907 | B1 | 1/2002 | Petty et al. |
| 6,762,773 | B2* | 7/2004 | Kolde et al. ............... 715/716 |
| 6,920,607 | B1 | 7/2005 | Ali et al. |
| 7,003,726 | B2* | 2/2006 | Walker et al. ............... 715/717 |
| 7,376,571 | B1* | 5/2008 | Racine et al. ............... 705/1 |
| 2002/0085045 | A1* | 7/2002 | Vong et al. ............... 345/840 |
| 2002/0101448 | A1 | 8/2002 | Sanderson |
| 2002/0116459 | A1* | 8/2002 | Zuberec et al. ............... 709/204 |
| 2003/0226111 | A1 | 12/2003 | Wirts et al. |
| 2003/0227481 | A1 | 12/2003 | Arend et al. |
| 2004/0066397 | A1 | 4/2004 | Walker et al. |
| 2004/0095388 | A1 | 5/2004 | Rocchetti et al. |
| 2004/0216059 | A1* | 10/2004 | Vong et al. ............... 715/840 |
| 2004/0229200 | A1 | 11/2004 | McKeon et al. |
| 2004/0230911 | A1 | 11/2004 | Bent et al. |
| 2005/0071853 | A1 | 3/2005 | Jones et al. |
| 2005/0114435 | A1 | 5/2005 | DiPlacido et al. |
| 2005/0172261 | A1 | 8/2005 | Yuknewicz et al. |
| 2006/0195460 | A1* | 8/2006 | Nori et al. ............... 707/100 |
| 2007/0016393 | A1* | 1/2007 | Vinberg et al. ............... 703/13 |

FOREIGN PATENT DOCUMENTS

WO WO0029950 5/2000

OTHER PUBLICATIONS

Clerckx et al., "Generating Context-Sensitive Multiple Device Interfaces from Design" Available at http://research.edm.luc.ac.be/tclerckx/clerckxluyten-CADUI2004.pdf.
Furtado et al., "KnowiXML: A Knowledge-Based System Generating Multiple Abstract User Interfaces in USIXML" Available at http://www.isys.ucl.ac.be/bchi/publications/2004/Furtado-TAMODIA2004.pdf.

(Continued)

*Primary Examiner*—Tadeese Hailu
(74) *Attorney, Agent, or Firm*—Lee & Hayes, PLLC

(57) ABSTRACT

A user interface is composed using methods and systems that allow modifying or re-using existing user interfaces, or creating new user interfaces. In providing for such interfaces, context-sensitive or context specific attributes that are associated with a particular user, user groups, and/or application(s) are used as the basis of composition. This allows for the dynamic creation of user interfaces based upon the situation.

18 Claims, 5 Drawing Sheets

OTHER PUBLICATIONS

Limbourg et al., "USIXML: A User Interface Description Language for Context-Sensitive User Interfacrs" Available at http://xml.coverpages.org/Limbourg-UIXML2004.pdf.

Sousa et al., "A Unified Process Supported by a Framework for the Semi-Automatic Generation of Multi-Context Uls" Available at http://www.mentores.com.br/kenia/publications/DSVIS2005.pdf.

* cited by examiner

FLEXIBLE MANAGEMENT USER INTERFACE FROM MANAGEMENT MODELS

BACKGROUND

A user interface or UI is used by an operator or user to interact with an application program or programs (application) resident on a computer. The UI may or may not be part of the application. In certain cases, a UI may be called by an operating system running on the computer. Typically, the user UI is specific to the application, particularly tailored to specific users, and/or specific to a system under management (i.e., computer) that is running the application.

UIs may implement graphic objects, such as buttons and menus, which are represented to a user on a screen or display. Particular state transitions (transitions) and actions may be associated with specific graphic objects. For example, transitions and actions occur when the user activates a particular graphic object. Through the UI, the activation causes the particular graphic object to perform a specific task or cause a specific action. These graphic objects, and their associated transitions and actions, are particularly hard-coded into the UI, meaning that the graphic objects, and their associated transitions and actions, are written to handle specific situations. In other words, user interfaces and tools that implement UIs are generally monolithic and non-reusable.

There are cases when it is desirable to provide a different or modified UI to support different applications, users, and/or systems under management. For example, there may be a situation when it is desirable to provide a different transition or action associated with a graphic object in the UI. However, providing different or new UIs may involve extensive knowledge of the application and/or preexisting UI that supports the application. Furthermore, extensive revisions to preexisting UI code or new user UI code may be needed.

SUMMARY

Methods and computing devices are provided that enables the composition of context-sensitive user interface. Data objects that describe actions performed through a user interface, and acting on one ore more application programs are associated with context-sensitive attributes. A user interface is generated based on the associations, and provided to a user.

This Summary is provided to introduce a selection of concepts in a simplified form that are further described below in the Detailed Description. This Summary is not intended to identify key features or essential features of the claimed subject matter, or is it intended to be used as an aid in determining the scope of the claimed subject matter.

BRIEF DESCRIPTION OF THE CONTENTS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

Figure 1:
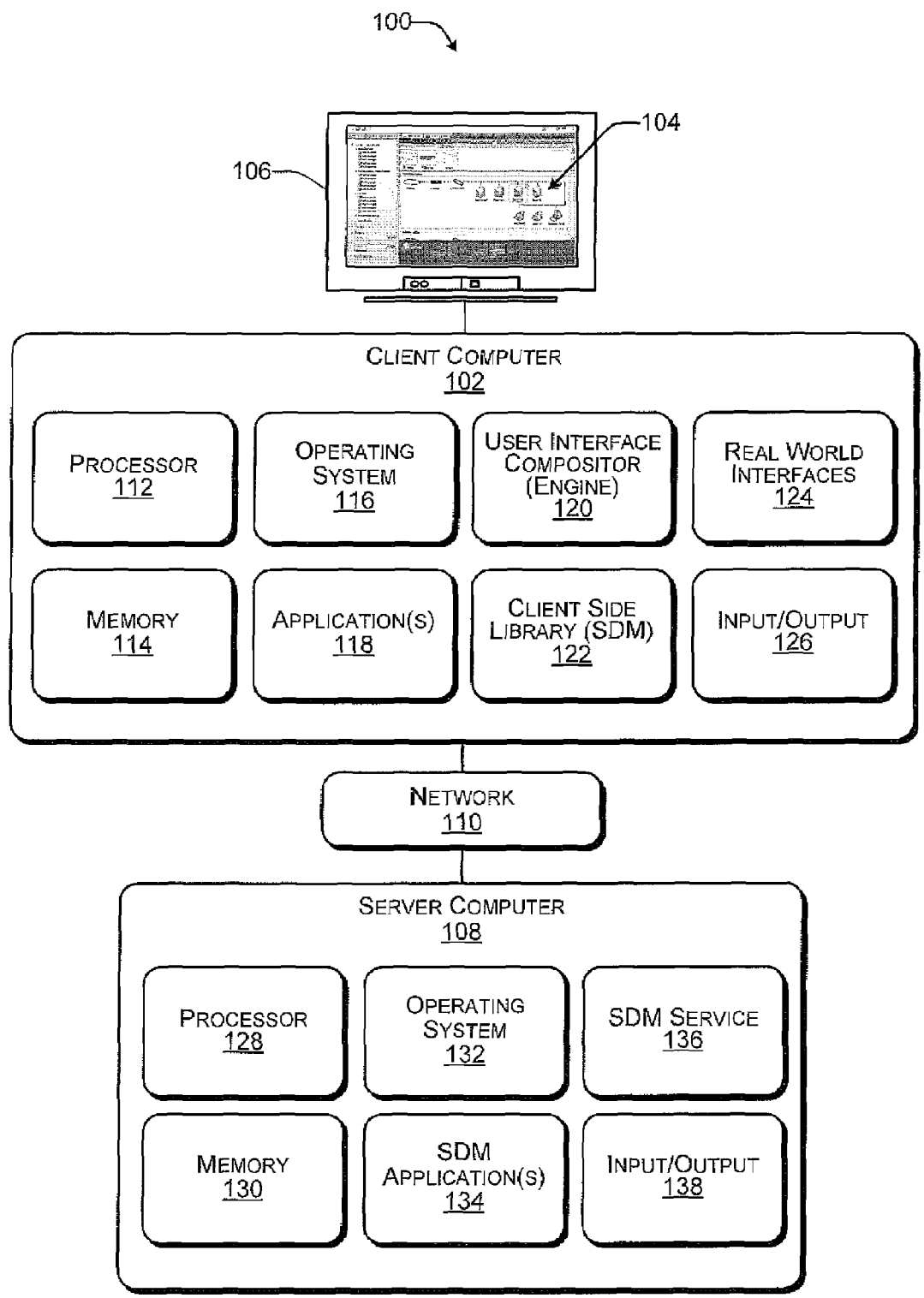
FIG. 1 is an illustration of an exemplary server-client system that supports declarative and compositional user interface control generation.

FIG. 1 shows an exemplary system 100 that supports declarative and compositional user interface control generation at a client computer 102. In other implementations, system 100 may include multiple client computers, collectively the multiple computers may be viewed as a "system under management". The client computer 102 may be one of various computing devices, including a desktop personal computer (PC), laptop PC, mainframe, etc. A user interface or UI 104 is provided and displayed on a display device or screen 106 which is connected to client computer 102. The example UI 104 is generated and provided using the methods described below. In cases where a "system under management" is applicable, the particular UI 104 may be used by each of the multiple computers and/or multiple users of a division. Interaction with the UI 104 may be provided through one of various user operated devices (not shown for clarity), such as a keyboard, touchpad, mouse, etc.

In certain implementations, client computer 102 is a standalone device; however, in this example, client computer 102 is included in system 100, along with a server computer 108. Client computer 102 is connected to server computer 108 by a network 110. The network 110 may include one or more networks, including the Internet. In particular, server computer 108, as further discussed below, may provide management models and user interface (UI) models that allow customizable or configurable user interfaces (UI), such as UI 104, at client computer 102. Client computer 102 may also be connected to other computers, computing devices, storage devices, etc. through network 110.

Client computer 102 includes a central processing unit, or one or more processors, as represented by processor 112. Processor 112 may control or access a storage device or a memory 114. Client computer 102 includes an operating system 116, which in certain implementations, may reside in memory 114. The client computer 102 includes one or more application programs or application(s) 118 that are controlled by the processor 112. In particular, one or more of the applications 118 may be accessed or controlled by the UI 104.

The client computer 102 includes a user interface (UI) engine or UI compositor 120, which is farther described below. UI compositor 120 may be part of a platform and particularly support operating system 116, or may be included in a development kit of applications that is used by client computer 102. Some of the functions UI compositor 120 provides include instantiating user interfaces such as UI 104; accepting user activated instructions (e.g., mouse clicks); deciding based on the user activated instructions which of available transitions to invoke; and determining queries to run, where a query is used to determine a set of objects and actions to display after a transition.

A client side library 122, which is further described below, is included in client computer 102. Client side library 122 may include and provide data objects, which can be discrete UI code, to UI compositor 120. Data objects, along with particular examples of data objects, are described below. The client side library 120 may also include management models and user interface (UI) models that are used by or provided to UI compositor 120.

Management models and UI models, collectively referred to as "models" may be described or written using "system definition model" or SDM. SDM is a schema, construct, or modeling language that describes the behavior of applications (e.g. applications 118), and the relationships and/or interaction of components of different applications. In particular, SDM is an extensible markup language or XML based application modeling language. A modeling language, such as SDM, may be used to create definitions of distributed systems; a distributed system being a set of related software and hardware resources working together to accomplish a common function. In the examples that are described, SDM is referred to; however, it is contemplated that other constructs or modeling languages may be employed. In specific, modeling languages can allow a user interface, such as UI 104, to be built declaratively. Such UIs may also be associated with specific components of a computer or "system under management", by associating corresponding models. The models, in combination with UI compositor 120 can provide for a flexible, customizable, and extensible user interface (UI) framework to manage applications (e.g., applications 118).

The client computer 102 further includes external or real world interfaces 124 which may include interfaces to other non-SDM objects such as ".NET" objects, and interfaces to particular operating systems and platforms such as UNIX or Microsoft Windows® operating systems and platforms. Client computer 102 includes input/output 126 which may support the sending and receiving of communication data over network 110 and server computer 108. For example, particular transportation protocols, such as remote desktop protocol (RDP), and communication protocols, such as transmission control protocol over Internet protocol (TCP/IP), may be implemented using input/output 126 which may include the proper encoders, decoders, and other devices to support such protocols (i.e., communication).

The server computer 108 includes a central processing unit, or one or more processors as represented by processor 128. Processor 128 may control or access a storage device or a memory 130. Server computer 108 includes an operating system 132 which may reside in memory 130. The server computer 108 includes one or more application programs or applications 134 controlled by processor 128. Applications 134 may particularly include SDM applications. The SDM applications may include applications that access the client side library 122 of client computer 102. Specific examples of SDM applications are applications directed to, based upon information in the management model, enforce the configuration, deploy an application or configuration to a system, discover the configuration of a system, or monitor the configuration of a system.

Server computer 108 may include an SDM service 136 that provides models (i.e., management models and user interface models) to client computer 102. An input/output 138 is included in server computer 108, which supports communication over network 110 and to client computer 102. As discussed above, particular transportation protocols, such as RDP, and communication protocols, such as TCP/IP, may be used in sending and receiving of communication data over network 110. Input/output 138 may include the necessary encoders, decoders, and other devices to support communication over network 110 and to client computer 102. In particular, through the input/output 138, applications 134 may communicate or access the client side library 122.

Figure 2:
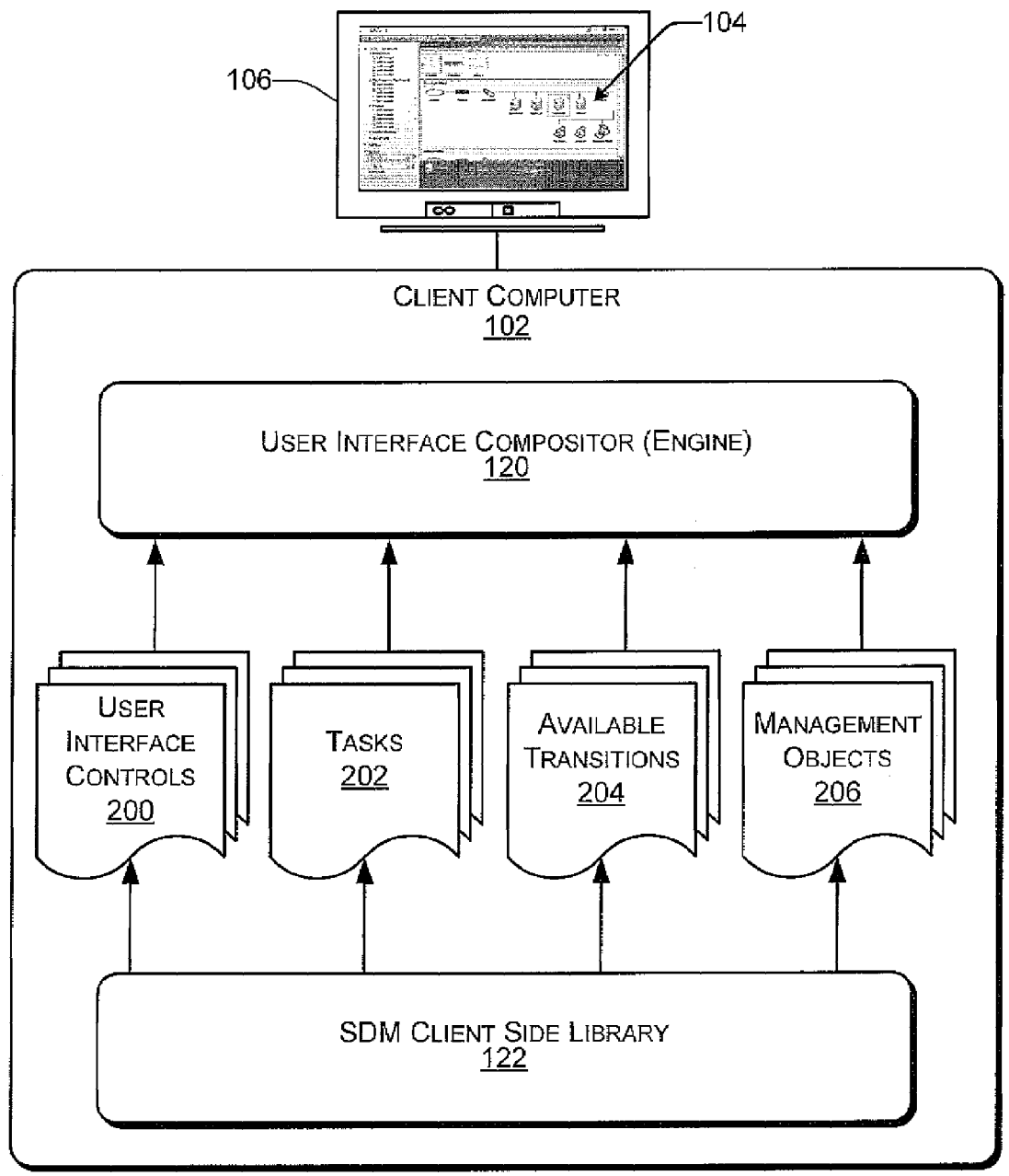
FIG. 2 is an illustration of an exemplary client computer that provides a declarative and compositional user interface.

FIG. 2 shows client computer 102 and UI 104 that is a declarative and compositional user interface. Artifacts are presented on UI 104, where artifacts are graphical objects that include buttons, menus, etc. which may be activated by a user. In particular, the user interface 104 allows context-sensitive selection of the artifacts, and navigation between the artifacts or sets of the artifacts.

Data objects may be defined as models or code that describe or provide for UI (e.g., UI 104) behavior or actions. Examples of data objects include user interface controls 200, tasks 202, available transitions 204, and management objects 206. Controls 200 may provide or describe actions that are performed when an artifact is activated or initiated by a user. The management objects 206 may be scoped to a given context by a query performed against the SDM store, which contains a representation of the system to be managed.

For artifacts that are shown on UI 104, there may be a set of available transitions 204 which are stored as part of meta-data or a UI model for a current view of UI 104. Examples of available transitions include the following actions: "display all of the computers which host this application"; "display all the groups that this user is a member of"; and "display all of the user objects in the engineering department". The available transitions 204 may be specified by a UI model stored in the client side library 122. UI models may be connected to an artifact either directly (i.e. the transition is defined directly on the class of the selection) or via inheritance (i.e. the transition is defined on a class from which the selected object or artifact class inherits).

To further illustrate available transitions 204, an example of a user role is described. A "user role" is defined as the function a user or group of users (e.g., administrator, help desk engineer, end-user) has in an organization. Because a user role may have particular characteristics or requirements, the UI for the user role may be context-sensitive or based on the particular requirements of the user role. A context-sensitive UI or user experience generation may be applicable to situations other than user roles, such as computer roles, geographic locations or divisions in an organization. A context-sensitive UI can be driven by any available characteristic of the user, computer, or grouping that is appropriate. A UI model for the particular user role, such as administrator, may describe a list view for displaying collections of artifacts which represent UI data objects. Each of the artifacts or data objects would be displayed in the list view, a type specific to the administrator user role. A UI model for a different user role, such as a help desk engineer, may describe an alternative view, such as a topology view, for displaying the same collection of artifacts which represent UI data objects. Therefore, a UI (e.g. UI 104) could dynamically generate a UI based upon the user's role, displaying the appropriate view. In this example, there may be a base user role UI model. The base user role UI model would have attached to it a transition called "display contained objects". The administrator UI model, inherits from the base user role UI model and overrides a query specification to indicate exactly how contained objects (i.e., data objects) are queried for, providing a declarative mechanism for specifying UI available transitions.

Using a similar mechanism as described above in regards to available transitions 204, an artifact or data object may also be associated with a set of operations or tasks 202. Tasks 202 may include a specification as to how a task is exposed (i.e., accessed); a specification as to how the task is performed, including pointers to executives, operating system shells, and/or command line script; and a specification as to how completion of the task is notified, results returned, and displayed to a user.

A UI model (i.e., set of meta-data) may be associated with each artifact or data object. In particular, the UI model may describe how an artifact is displayed. Information in the UI model may include specifications for format of data display, information (i.e., meta-data) sufficient for data binding, and differentiation information describing UI controls that are used for which user and machine roles. When other differentiators may be needed, the UI model may provide for several functions, including describing how to display a particular class of artifacts or data objects as part of a list, how to display and edit the attributes of the particular artifact or data objects, and other miscellaneous information.

The structure of a UI model may be attached in parallel to class definition hierarchy of an artifact or data object classes, allowing for the provision of a scaled mechanism for customization and tailoring of a UI to specific task collections, and specific user skill sets or attributes as to a particular UI (e.g., attributes for a division). This example structure allows for a way of filtering properties, so that only specified properties are available to a particular UI; a way to attach code fragments to implement business logic to specific UI events; a way to chose different standard controls to display a particular artifact or display object type, and specify data bindings of a UI to an artifact or display object type; allow for replacement of the UI (i.e. specify an assembly containing a new control, and the data bindings that connect it to the object type); and allow a UI to inherit from one class to another, making it easier to create a UI for a new component of a system without the need to do a lot of custom work.

Figure 3:
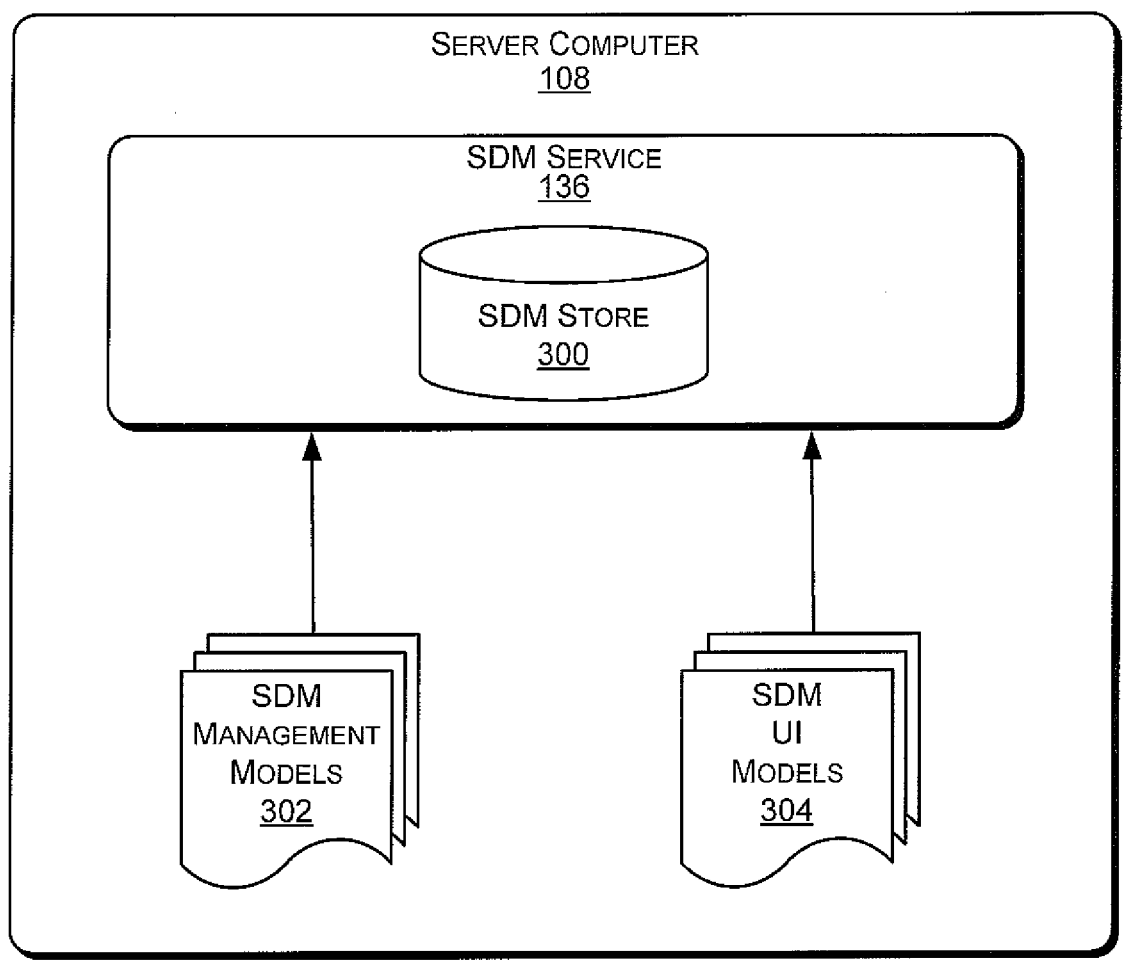
FIG. 3 is an illustration of an exemplary server computer that provides management models and user interface models.

FIG. 3 shows server computer 108 which provides management models and UI models. A memory or SDM data store 300 that is included as part of SDM service 138 which is used to store the available management and UI models, and the representation of the system under management. As discussed above, SDM service 136 supports or provides "models" to client computer 102. In particular, management models 302 and UI models 304 are used to describe a UI, such as UI 104. Management models 302 and UI models 304 specifically define or describe the behavior or interrelationship of parts that are used to compose a UI.

In this example, the server computer 108 through its SDM service 136 provides predefined "models" in management models 302 and UI models 304; however, it is contemplated, that a user or other party may modified "models" of management models 302 and UI models 304 to compose or provide a unique or particular UI to client computer 102.

Server computer 108, and particularly SDM service 136, includes an SDM store 300. As described above, the server computer 108 may provide management models 302 and UI models 304. In this example, management models 302 and UI models 304 are written or described in SDM. Furthermore, management models 302 and UI models 304 to support particular users, implementations, and/or applications as desired.

Figure 4:
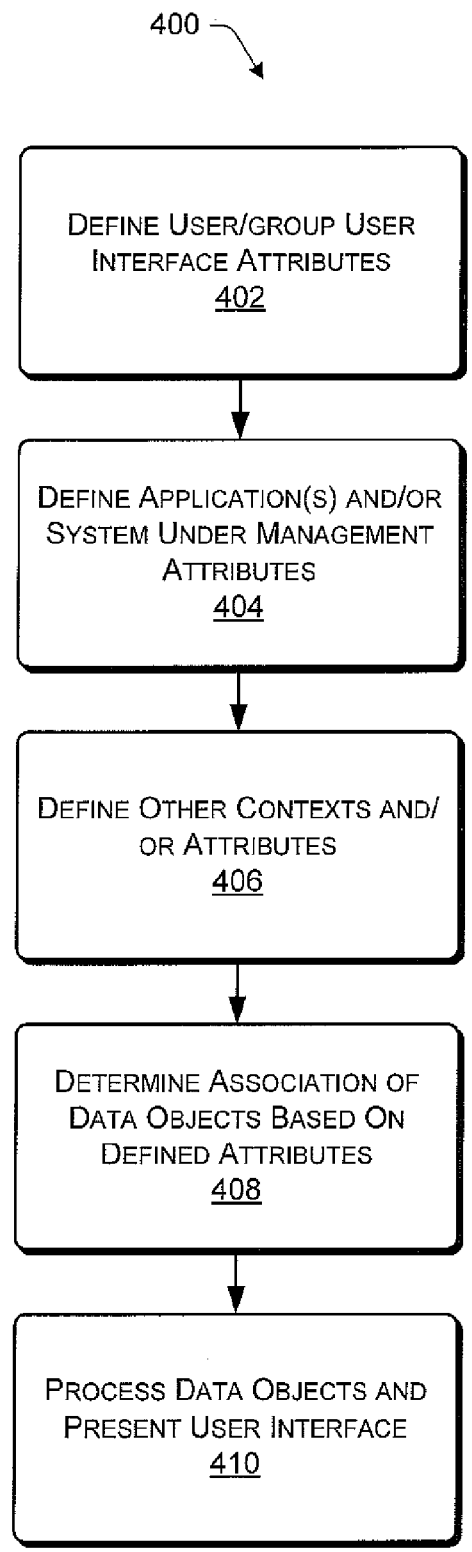
FIG. 4 is a flowchart illustrating a process for generating a declarative and compositional user interface.

FIG. 4 shows a process 400 that provides for declarative and compositional user interface generation. The process 400 is illustrated as a collection of blocks in a logical flow graph, which represent a sequence of operations that can be implemented in hardware, software, firmware, or a combination thereof. In the context of software, the blocks represent computer instructions that, when executed by one or more processors, perform the recited operations. Although described as a flowchart, it is contemplated that certain blocks may take place concurrently or in a different order.

At block 402, attributes or requirements for a particular user interface or UI for a specific user or user group, such as a division, are defined. The attributes may be directed as to how particular artifacts of a UI are presented to the user or user group, how transitions are to perform when a user activates an artifact on the UI, and specific tasks to be performed for the user or user group. A management model may be created or defined with the particular user or user group attributes. The management model may either be provided through a computer or device (e.g., server computer 108) than the computer or device (e.g., client computer 102) that implements the UI.

At block 404, the attributes for particular applications that are controlled by the UI are defined. Furthermore, attributes associated with the computer, or multiple computers (computer group) or a "system under management", are defined. Such attributes are unique to the application and/or or system under management, and are particular to the UI. The management model described in block 402 may be provided with these particular application specific attributes.

At block 406, other attributes may be defined for other contexts. Examples of different contexts include individual users, particular application programs, and any exception situations. The management model that is described in block 402 may be provided with these particular attributes. The attributes that are defined are context-sensitive and particular to the UI.

At block 408, based on the defined attributes described in blocks 402, 404, and 406, data objects are determined. The determining is particularly directed to the data objects and the defined attributes as processed by the management model described in block 402. Examples of data objects in which the associations are performed include UI controls, tasks, available transitions, and management objects. The data objects performed particular actions that support the UI. Associations of data objects may be based on inheritance, where a particular association inherits from a higher level association.

At block 410, the data objects and their associations with the defined attributes are processed. The processing may be performed through the management model. A UI model that defines how artifacts that represent the data objects are presented in a UI to a user. The UI based on the UI model, and composed and generated based on the described and defined attributes is presented to the user.

Figure 5:
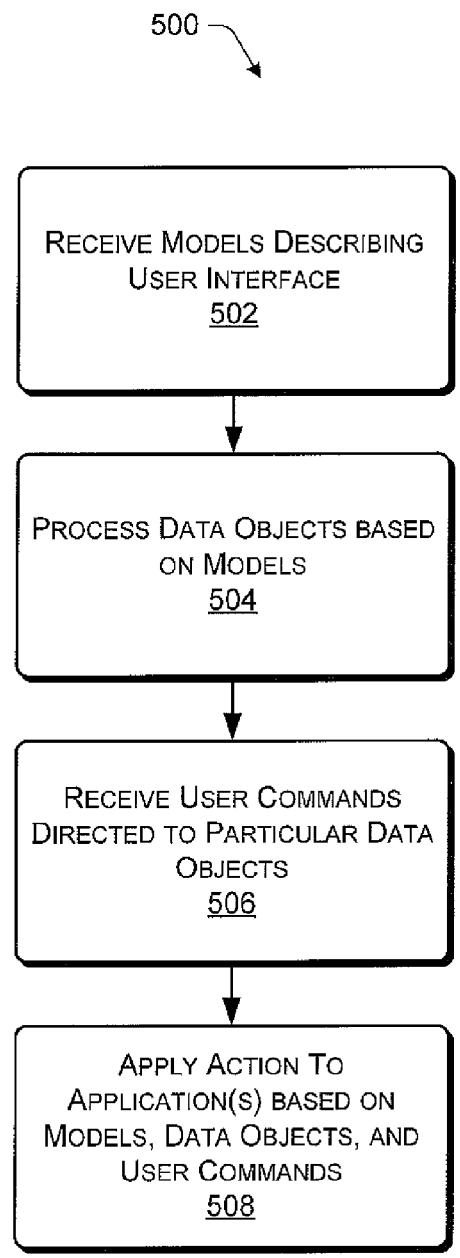
FIG. 5 is a flowchart illustrating a process that supports a user interface that is declaratively defined and composed.

FIG. 5 is a flowchart illustrating a process that supports a user interface that is declaratively defined and composed. The process 500 is illustrated as a collection of blocks in a logical flow graph, which represent a sequence of operations that can be implemented in hardware, software, firmware, or a combination thereof. In the context of software, the blocks represent computer instructions that, when executed by one or more processors, perform the recited operations. In an implementation, the user interface compositor 120 as described in FIGS. 1 and 2 above may implement process 500. Although described as a flowchart, it is contemplated that certain blocks may take place concurrently or in a different order.

At block 502, management models and UI models that support a particular UI or UIs is received and process. A particular management model and UI model may be provided for a UI specific to a user or user group. Furthermore, customizing of a UI may also directed, for example, compositing a UI from different applications into a single application without having to re-write the UI.

At block 504, data objects, such as UI controls, tasks, available transitions, and management objects are received and process according to the management model of block 502. The UI, and particularly UI artifacts, are displayed according to the UI model of block 502. The UI model may include specifications directed to the format of data display (which includes data binding), UI control differentiation, the display of different classes of artifacts or data objects, and display attributes of particular artifacts.

At block 506, a user may activate artifacts on the UI, where artifacts are associated with particular data objects. User commands activating the artifacts (data objects) may be through one of various UI devices, such as a mouse. Initiating a UI device action, such as a mouse click, initiates the commands, or recycle the process (i.e. if it's a transition it will cycle back through painting the UI again).

At block 508, through the management model, and particularly the associations of data objects with particular actions as defined by the management model, application programs or applications supported by the UI are acted upon. For example, a user may activate an artifact on the UI, where the artifact is associated with a particular data object. Based on how the management model defines the data object, particular actions are performed by the data object.

CONCLUSION

The above-described methods and devices describe composing and generating a context-sensitive user interface. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method performed at a computing network comprising:
    providing a management model by a server computer of the computing network to a client computer of the computing network;
    defining context-sensitive attributes particular to a higher level user interface by the server computer through the management model;
    accessing a client side library of the client computer by the server computer through the management model, the client side library comprising data objects;
    associating the data objects with the context-sensitive attributes by the server computer through the management model;
    processing the context-sensitive attributes with the data objects by the server computer through the management model; and
    implementing the higher level user interface by the server computer through the management model with artifacts that are associated with the data objects on the client computer, with the higher level user interface being connected to the artifacts via:
        a) directly through a class of the artifacts associated with the higher level user interface; or
        b) inheritance through all lower level user interfaces that are connected directly with respective lower level artifacts.

2. The method of claim 1, wherein the defining context-sensitive attributes is directed to one or more of the following: user, user groups, computer, computer group, and application programs.

3. The method of claim 1, wherein the management model based on the context-sensitive attributes.

4. The method of claim 1, wherein the associating includes one or more of the following data objects: UI controls, tasks, available transactions, and management objects.

5. The method of claim 1, wherein the associating is based on inheritance, wherein the association is based on higher level associations.

6. The method of claim 1, wherein the presenting is performed by user interface model that that defines how the artifacts are presented on the user interface.

7. The method of claim 1, wherein the inheritance allows for filtering of properties of the lower level user interfaces.

8. A method performed at computing network comprising:
    providing a management model by a server computer of the computing network to a client computer of the computing network, wherein the management model describes data objects used for a higher level user interface;
    defining context-sensitive attributes particular to the higher level user interface by the server computer through the management model;
    accessing a client side library of the client computer by the server computer through the management model, the client side library comprising data objects;
    associating the data objects with the context-sensitive attributes by the server computer through the management model;
    processing the context-sensitive attributes with the data objects by the server computer through the management model; and
    implementing the higher user interface by the server computer through the management model with artifacts that are associated with the data objects on the client computer, with the higher level user interface being connected to the artifacts via:
        a) directly through a class of the artifacts associated with the higher level user interface; or
        b) inheritance through all lower level user interfaces that are connected directly with respective lower level artifacts;
    receiving user commands directed to activation of one or more of the artifacts; and
    acting on one or more application programs based on the user commands that are received.

9. The method of claim 8, wherein the user interface model includes one or more of the following data objects: user interface controls, tasks, available transactions, and management objects.

10. The method of claim 8, wherein the receiving is initiated by a user through a user interface device connected to the computing device.

11. The method of claim 8, wherein the acting is performed by the management model.

12. A computer network comprising:
    a client computer;
    a server computer providing a management model to the client computer, the client computer comprising:
        a processor;
        a higher level user interface implemented by the processor, the processor controlled by the server computer through the management model, wherein the higher level user interface is generated based on context-sensitive attributes;
    a user interface compositor that composes the higher level user interface with artifacts based on the management model and user interface model that associates the context-sensitive attributes; and
    a library that is accessed by the client computer through the management model to provide data objects to the user interface compositor wherein the library includes data objects that are associated with the context-sensitive attributes, the data objects being associated with the artifacts, with the higher level user interface being connected to the artifacts via:
        a) directly through a class of the artifacts associated with the higher level user interface; or
        b) inheritance through all lower level user interfaces that are connected directly with respective lower level artifacts.

13. The computer of claim 12, wherein the user interface is generated by the user interface model.

14. The computer of claim 12, wherein the user interface supports a particular operating system.

15. The computer of claim 12, wherein the user interface compositor further performs one or more of the following: instantiating user interfaces, accepting user activated instructions, deciding based on the user activated instructions which of available transitions to invoke, and determining queries to run.

16. The computer of claim 12, wherein the data objects of the library include one or more of the following: user interface controls, tasks, available transactions, and management objects.

17. The computer of claim 12, wherein the management model is described by system definition model.

18. The computer of claim 12, further comprising input/output to receive and transmit over one or more networks, based on particular communication and transport protocols.

* * * * *